US012639013B2

(12) United States Patent
Ayyapureddi et al.

(10) Patent No.: US 12,639,013 B2
(45) Date of Patent: May 26, 2026

(54) APPARATUSES AND METHODS FOR STAGGERED REFRESH OPERATIONS ACROSS MEMORY DEVICES OF A MODULE

(71) Applicant: Micron Technology, Inc., Boise, ID (US)

(72) Inventors: Sujeet Ayyapureddi, Boise, ID (US); Wesley W. Borie, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 19/012,535

(22) Filed: Jan. 7, 2025

(65) Prior Publication Data

US 2025/0238165 A1      Jul. 24, 2025

Related U.S. Application Data

(60) Provisional application No. 63/622,845, filed on Jan. 19, 2024.

(51) Int. Cl.
*G06F 3/06*          (2006.01)

(52) U.S. Cl.
CPC .......... *G06F 3/0659* (2013.01); *G06F 3/0604* (2013.01); *G06F 3/0673* (2013.01)

(58) Field of Classification Search
CPC ..... G06F 3/0604; G06F 3/0659; G06F 3/0673
See application file for complete search history.

(56) References Cited

U.S. PATENT DOCUMENTS

| | | | |
|---|---|---|---|
| 2004/0196718 A1 | 10/2004 | Poechmueller | |
| 2005/0229060 A1* | 10/2005 | Cochran .......... | G11C 29/50012 714/733 |
| 2009/0238021 A1 | 9/2009 | Ban et al. | |
| 2009/0316501 A1* | 12/2009 | Bunker .................. | G11C 29/70 365/201 |
| 2018/0349280 A1* | 12/2018 | Prasad .................. | G06F 12/128 |
| 2019/0130960 A1 | 5/2019 | Kim | |
| 2021/0005244 A1* | 1/2021 | Hiscock .............. | G11C 11/4096 |
| 2021/0343323 A1 | 11/2021 | Meier et al. | |

FOREIGN PATENT DOCUMENTS

KR          101977665 B1      5/2019

OTHER PUBLICATIONS

International Search Report and Written Opinion for International Application No. PCT/US2024/060746, mailed on Apr. 17, 2025; pp. all.
International Application No. PCT/US24/60746 titled "Apparatuses and Methods for Staggered Refresh Operations Across Memory Devices of a Module filed" Dec. 18, 2024, pp. all pages of the application as filed.

* cited by examiner

*Primary Examiner* — Larry T Mackall
(74) *Attorney, Agent, or Firm* — Dorsey & Whitney LLP

(57) ABSTRACT
A memory module includes a number of memory devices which receive refresh commands. Each memory device determines if it is that device's turn in a sequence, for example by counting the refresh commands. When it is not a device's turn, it performs refresh operations at a first rate responsive to the refresh commands. When it is the device's turn, it performs refresh operations at a second, lower, rate responsive to the refresh commands, for example by skipping refresh operations.

20 Claims, 6 Drawing Sheets

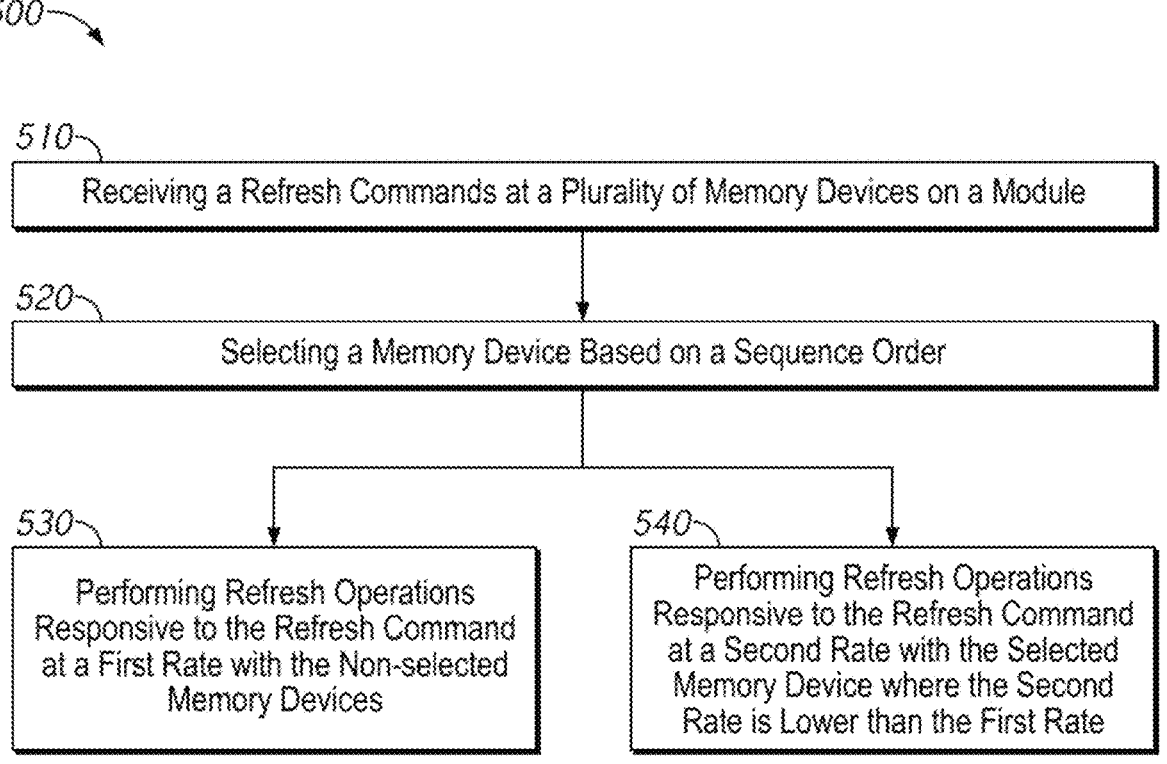

500

510
Receiving a Refresh Commands at a Plurality of Memory Devices on a Module

520
Selecting a Memory Device Based on a Sequence Order

530
Performing Refresh Operations Responsive to the Refresh Command at a First Rate with the Non-selected Memory Devices 540
Performing Refresh Operations Responsive to the Refresh Command at a Second Rate with the Selected Memory Device where the Second Rate is Lower than the First Rate

FIG. 5

APPARATUSES AND METHODS FOR STAGGERED REFRESH OPERATIONS ACROSS MEMORY DEVICES OF A MODULE

CROSS-REFERENCE TO RELATED APPLICATIONS

This application claims the filing benefit of U.S. Provisional Application No. 63/622,845, filed Jan. 19, 2024. This application is incorporated by reference herein in its entirety and for all purposes.

BACKGROUND

This disclosure relates generally to semiconductor devices, and more specifically to semiconductor memory devices. In particular, the disclosure relates to volatile memory, such as dynamic random access memory (DRAM). Information may be stored on individual memory cells of the memory as a physical signal (e.g., a charge on a capacitive element). During an access operation, an access command may be received along with address information which specifies which memory cells should be accessed. Multiple memory devices may be packaged together in a module, which is operated by a controller.

Information may decay over time in the memory cells. In order to preserve the integrity of the stored information, the memory cells may be refreshed. However, refreshing memory cells may take up power, as well as time which the memory could have spent on other operations. There may thus be a benefit to reducing the amount of memory operations, without reducing them so much that information is lost.

BRIEF DESCRIPTION OF THE DRAWINGS

FIG. 5 is a flow chart of a method according to some embodiments of the present disclosure.

DETAILED DESCRIPTION

Figure 1:
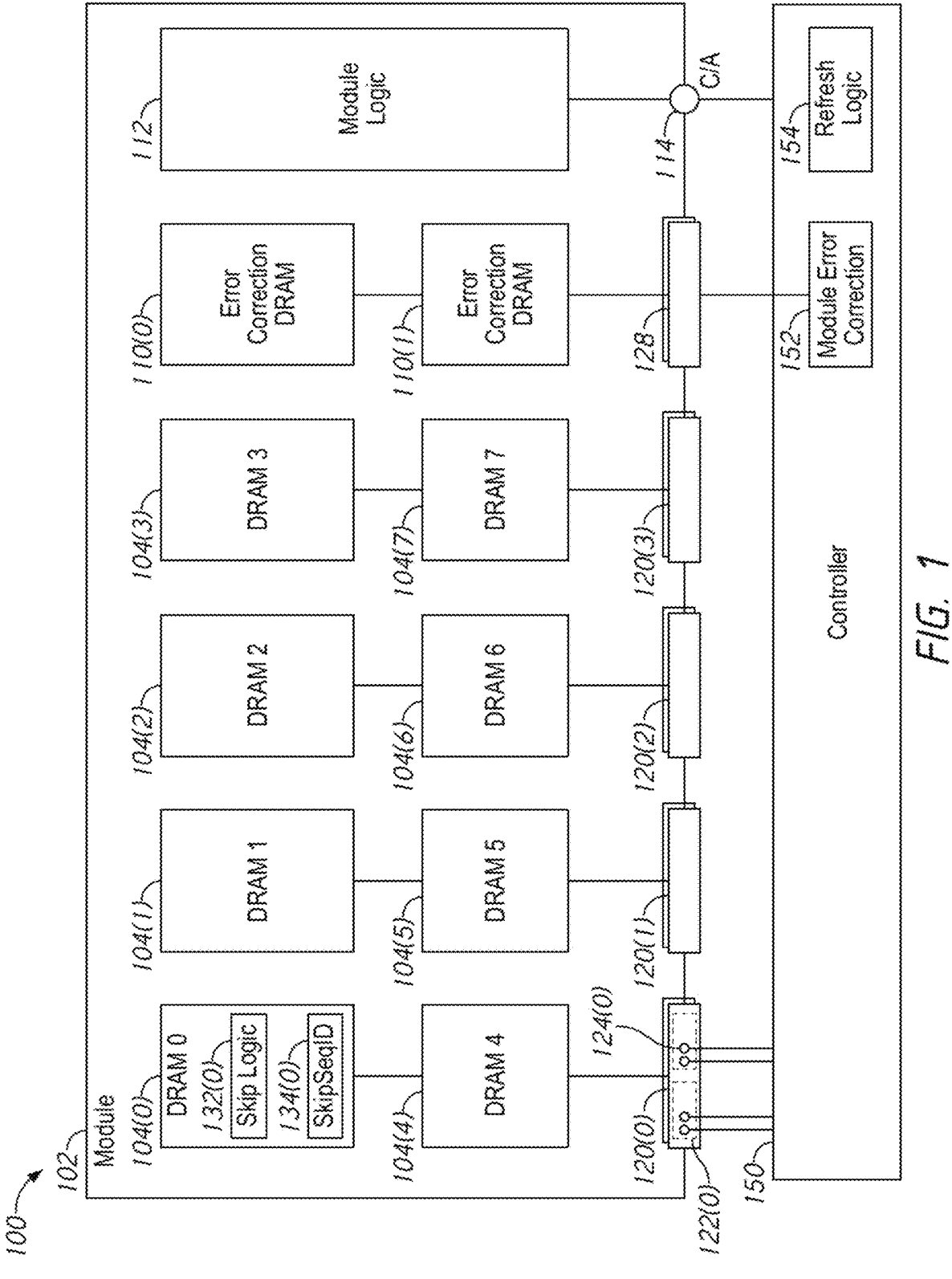
FIG. 1 is a block diagram of a memory system according to some embodiments of the present disclosure.

The following description of certain embodiments is merely exemplary in nature and is in no way intended to limit the scope of the disclosure or its applications or uses. In the following detailed description of embodiments of the present systems and methods, reference is made to the accompanying drawings which form a part hereof, and which are shown by way of illustration specific embodiments in which the described systems and methods may be practiced. These embodiments are described in sufficient detail to enable those skilled in the art to practice presently disclosed systems and methods, and it is to be understood that other embodiments may be utilized and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The following detailed description is therefore not to be taken in a limiting sense, and the scope of the disclosure is defined only by the appended claims.

Memory devices store information in memory arrays. The memory array includes a number of memory cells, organized at the intersection of word lines (rows) and bit lines (columns). Each memory cell may store a bit of information. During an access operation, a row address may be used to specify a word line and a column address may be used to specify one or more bit lines. The information in the memory cells at the intersection of the specified word line and bit lines may be accessed. Memory devices may perform refresh operations to maintain the integrity of the information stored in the array. For example, a memory may perform refresh operations on a row-by-row basis. The refresh operations may be performed at a rate such that the array is refreshed within a refresh period. The duration of the refresh period may be set based on an expected rate of information decay, and the refresh rate may be adjusted based on memory conditions such as temperature.

Memory devices may be packaged together onto a memory module. The memory module may include a number of memory devices, each of which stores data, and one or more error correction memory devices, which may store information used to correct errors when data is read out from the memory. Since the module is capable of performing error correction, there may be an increased tolerance for errors from the individual memory devices (e.g., caused by loss of information). Accordingly, it may be possible to reduce the amount of refresh operations that the devices perform which may save both time and power.

The present disclosure is drawn to apparatuses, systems, and methods for staggered refresh operations across memory devices of a module. The controller may provide refresh signals to the memory devices of the module. Some of the memory devices may perform refresh operations at a first rate responsive to the refresh signals while other memory devices may perform refresh operations at a second, lower, rate responsive to the refresh signals. The device(s) which perform at a lower rate may be selected based on a sequence order (or turn order) of the devices. For example, the selected one or more memory devices may skip performing at least some refresh operations which are performed by the non-selected devices. For example, responsive to a refresh signal some memory devices of the module may perform refresh operations while other memory devices may not. To prevent any one device from going too long without performing refresh operations, the memory devices may rotate through a sequence of which device's turn it is to skip refresh operations. Each memory device may include skip logic with determines if it that device's turn as well as whether or not to skip refresh operations during the turn. In this manner, the memory devices may rotate through which device is currently selected to be performing refresh operations at a lower rate than the other, non-selected, devices of the module.

An example memory device of the present disclosure includes a skip logic circuit which counts a number of refresh commands using a first count value. When that first count value reaches a threshold (e.g., a number of refresh commands required to refresh all or part of a memory device), the first count value may reset and a second count value may be changed. The second count value may be used to determine if it is the device's turn. For example, when the second count value matches a skip sequence ID value stored in the device it may be that device's turn. Different devices on the module may have different skip sequence ID values to set a sequence order. Once the second count value matches the skip sequence ID value, the skip logic circuit may provide a skip signal at an active level for one or more subsequent refresh commands. While the skip signal is active, the device may skip performing refresh operations. For example, after the second count value matches the skip sequence ID value, the skip logic may keep the skip signal inactive for a refresh period, then activate it for a refresh period (e.g., the number of refresh commands it takes to fully refresh the array). Other patterns may be used in other example embodiments. In this manner, the selected device may perform refresh operations at a lower rate (compared to the other devices) for a time after it is selected.

In some embodiments, the sequence may be set up such that no two devices on the module are operating with a lowered refresh rate at the same time. In other words, the period over which a device is performing fewer refresh operations may not overlap with the period over which any other device on the module is performing fewer refresh operations. In some embodiments, the skip logic may use one or more additional criteria to determine whether to skip refresh operations or not. For example, the skip logic circuit may check an error correction and scrub (ECS) register, which tracks a number of errors detected on the memory device. If the ECS register is above a threshold, then the skip logic may not provide the skip signal, even if it is the device's turn.

FIG. 1 is a block diagram of a memory system according to some embodiments of the present disclosure. The memory system 100 includes a memory module 102 and a controller 150 which operates the memory module 102. The module includes a number of memory devices 104 and 110. The memory devices 104 may be used to store data and may generally be referred to as data memory devices 104, while the memory devices 110 are used to correct errors in data read from the data memory devices 104. The memory devices 110 may be referred to as an error correction memory devices 110. A module logic 112 receives commands and addresses over a command/address C/A bus from the controller 150 through a C/A terminal 114 and distributes those commands and addresses to the memory devices 104 and 110 over internal command and address buses (not shown). Data is communicated between the controller 150 and the module 102 along data buses which couple to data terminals (DQ) terminals 124 of the module 102. The data terminals 124 are organized into pseudo-channels 122 and channels 120. Each channel 120 is a set of data terminals 124 associated with a memory device 104. A similar set of channels 128 couple the error correction devices 110 to the controller 150.

FIG. 1 shows an example 10×2p2 or 10×4 memory module 102 which may be used to implement some embodiments of the present disclosure. In the 10×4 architecture, there are ten total memory devices 104 and 110. Eight data memory devices 104(0) to 104(7) and two error correction memory devices 110(0) and 110(1). Other memory architectures may be used in other example embodiments. For example, there may be more or fewer data devices 104 and/or more or fewer error correction devices 110.

The data memory devices 104 are coupled to the controller through respective channels 120 and the error correction devices 110 are coupled through respective channels 128. Each channel 120(0) to 120(7) and 128(0) to 128(1) includes one or more pseudo-channels 122, which may be operated independently of each other. In this embodiment, each channel 120 or 128 includes two pseudo-channels 122, each of which includes two data terminals 124. Since the memory devices and channels may generally be similar to each other, only a single device 104(0) and its associate channel 120(0) are described in detail herein. Similarly, only internal components of a single data device 104(0) are shown and described. However, each of the data devices 104 (and/or error correction devices 110) may have similar components not shown in FIG. 1. Other numbers of pseudo-channels 122 per channel and other numbers of data terminals 124 per pseudo-channels may be used in other example embodiments.

In order to simplify the layout of the figure, an arrangement of two rows of four data devices 104 and one error correction device 110 each is shown, and their associated channels 120 are shown as stacked boxes. However, the representation of FIG. 1 does not necessarily represent the layout of a physical device. For example, a single row of 8 data devices 104 and two error correction devices 110 may be used. Similarly, various buses and signal lines have been simplified down to a single line for clarity on the drawing, however, multiple physical signal lines may be represented by a single line in the drawing.

During an example write operation, the controller 150 provides a write command and addresses (e.g., row, column, and/or bank addresses as explained in more detail herein) over the C/A terminal 114 to the module 102. The module logic 112 distributes the command and address to the data memory devices 104(0) to 104(7). The controller 150 also provides data to be written along the various DQ channels 120(0) to 120(7). Since the pseudo-channels 122 may be operated independently, we will consider a single pseudo-channel 122 and its two DQ terminals 124. Each data terminal receives a serial burst of bits, which together represent a codeword of data. For example, the memory device 104 may receive a burst of 16 serial bits along each of four DQ terminals. The received data is written to the memory array of the data devices 104.

As part of the write operation a module error correction circuit 152 of the controller may generate a set of module parity bits based on the data which is written. For example, the module parity bits may be based off of all of the data written to all of the data devices 104. For example, if each data device 104 receives 64 bits of data, then the module parity bits may be generated based off of the full set of 512 bits of data. The module parity bits may be written to the error correction devices 110 in a fashion analogous to the way the data is written to the data devices 104.

During an example read operation, the controller 150 provides a read command and addresses along the C/A terminal 114. The module logic 112 distributes these to the memory devices 104 to 110 and data is read out from the locations specified by the addresses in the data devices 104 and module parity is read out from the error correction devices 110.

The module error correction circuit 152 may perform error correction based on the amount of module parity bits which are read. For example, the module error correction circuit 152 may capable of 'chipkill' or correcting up to entire data from a data device 104. Other levels of module error correction may be used in other example embodiments.

During an example refresh operation (e.g., an auto-refresh operation), a refresh logic circuit 154 of the controller provides a refresh command to the module 102. The module logic 112 distributes the refresh command to the devices 104 and 110. Responsive to the refresh command (e.g., an all bank refresh command, a partial bank refresh command, etc.) the devices 104-110 perform one or more refresh operations, unless a skip logic circuit 132 of that device causes the device to skip performing one or more of the refresh operations instead.

Each of the devices 104 and 110 includes a refresh skip logic circuit 132 which determines whether refresh operations should be performed or skipped responsive to a refresh command from the controller 150. Each of the devices 104 and 110 includes a skip sequence identifier setting 134, which determines where that device is in a sequence order or turn order of the devices 104-110 on the module. The skip logic 132 may count through a sequence based on the number of received refresh commands and determine whether or not that device should skip refresh operations when it is that device's turn in the sequence (e.g., as determined by the skip sequence ID 134).

By skipping one or more of the refresh operations, the device whose turn it is may perform refresh operations at a lower rate (for a refresh command or set of refresh commands) than the device's whose turn it is isn't. In some embodiments, the devices may have turns which last for a refresh period (e.g., the number of refresh commands required to refresh the memory array of the device). In some embodiments, the period of time over which the device performs a lowered rate of refresh operations may be delayed compared to when the sequence matches that device's skip sequence ID 134. For example, after a device matches, it may perform refresh operations at the normal rate (e.g., not skip any refresh operations) for a refresh period, and then skip one or more refresh operations during the next refresh period. In some embodiments, when a device performs refreshes at a lowered rate, it may skip all refresh operations for a period of time. For example, a device may skip all refresh operations during a refresh period when it is that device's turn.

In some embodiments, each of the devices 104 and 110 may be set to have a different skip sequence identifier 134. For example, a first device 104(0) may have a skip sequence identifier of 0, a second device 104(1) may have a skip sequence identifier of 1, and so forth. Other patterns of skip sequence identifiers may be used in other embodiments. The error correction devices 110 may also be part of the sequence. For example, in a 10×4 module, with 8 data devices 104 and 2 error correction devices 110, the sequence may be ten elements long. In this manner, no more than one device may skip refresh operations responsive to a given refresh command (e.g., no more than one device may skip at a same time). Other patterns may be used in other embodiments, for example to enable no more than two, three or some other number of devices to skip at once.

Figure 2:
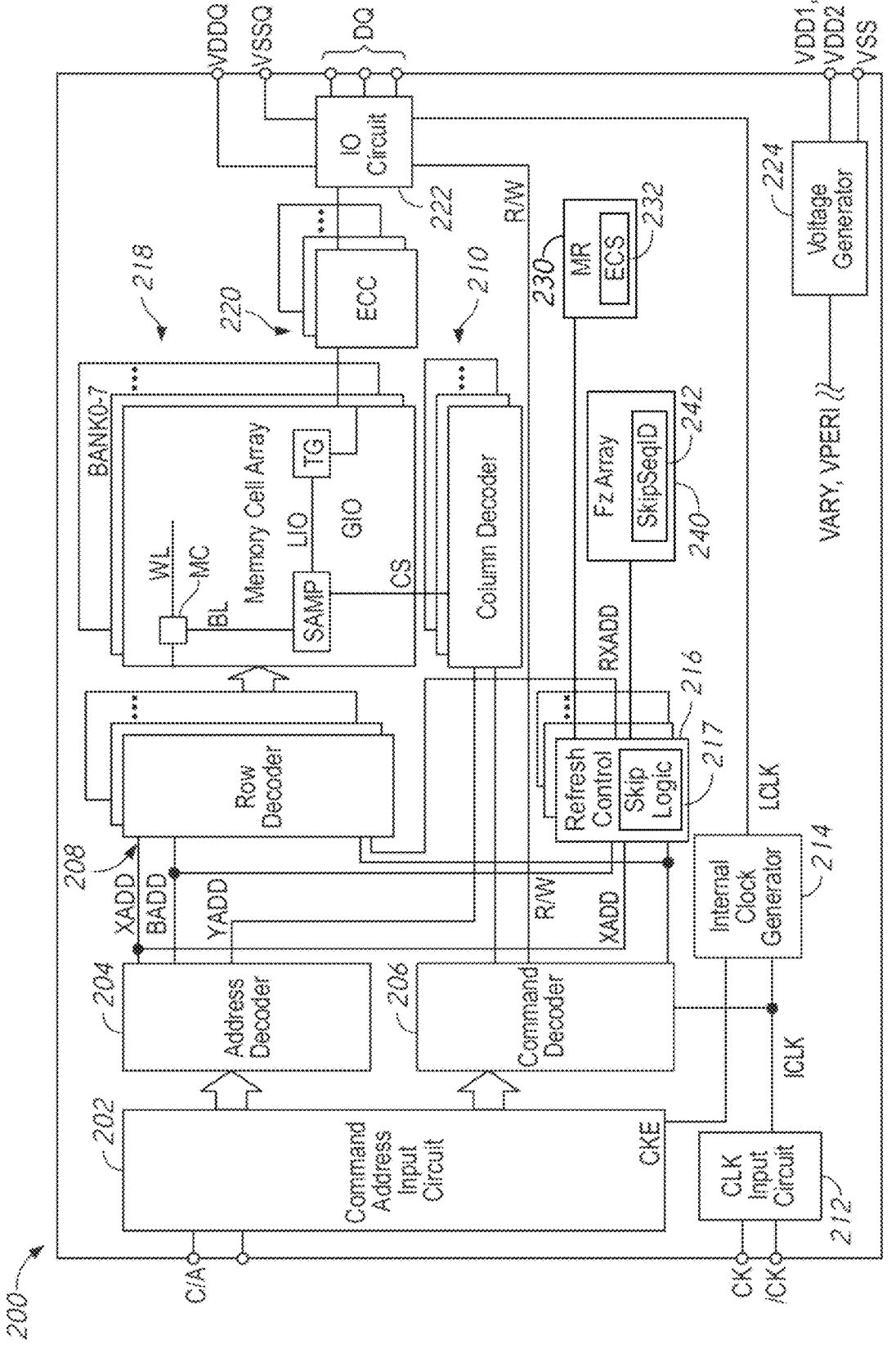
FIG. 2 is a block diagram of a semiconductor device according an embodiment of the disclosure.

FIG. 2 is a block diagram of a semiconductor device according to an embodiment of the disclosure. The semiconductor device 200 may be a semiconductor memory device, such as a DRAM device integrated on a single semiconductor chip. For example, the device 100 may implement one of the devices 104 of the module 102 of FIG. 1 and/or one of the devices 110 of FIG. 1. For the sake of explanation, the memory device 200 will generally be described with respect to the operations of a data device, such as 104 of FIG. 1, however the error correction devices 110 of FIG. 1 may, in some embodiments, operate in an analogous fashion.

The semiconductor device 200 includes a memory array 218. The memory array 218 is shown as including a plurality of memory banks. In the embodiment of FIG. 2, the memory array 218 is shown as including eight memory banks BANK0-BANK7. More or fewer banks may be included in the memory array 218 of other embodiments.

Each memory bank includes a plurality of word lines WL, a plurality of bit lines BL, and a plurality of memory cells MC arranged at intersections of the plurality of word lines WL and the plurality of bit lines BL. The selection of the word line WL is performed by a row decoder 208 and the selection of the bit lines BL is performed by a column decoder 210. In the embodiment of FIG. 2, the row decoder 208 includes a respective row decoder for each memory bank and the column decoder 210 includes a respective column decoder for each memory bank.

The bit lines BL are coupled to a respective sense amplifier (SAMP). Read data from the bit line BL is amplified by the sense amplifier SAMP and transferred to an ECC circuit 220 over local data lines (LIO), transfer gate (TG), and global data lines (GIO). Conversely, write data outputted from the ECC circuit 220 is transferred to the sense amplifier SAMP over the complementary main data lines GIO, the transfer gate TG, and the complementary local data lines LIO, and written in the memory cell MC coupled to the bit line BL.

The semiconductor device 200 may employ a plurality of external terminals, such as solder pads, that include command and address (C/A) terminals coupled to a command and address bus to receive commands and addresses, clock terminals to receive clocks CK and/CK, data terminals DQ coupled to a data bus to provide data, and power supply terminals to receive power supply potentials VDD, VSS, VDDQ, and VSSQ. The external terminals may couple directly to the controller (e.g., 150 of FIG. 1) and/or may couple to various buses/connectors of the module (e.g., 102 of FIG. 1).

The clock terminals are supplied with external clocks CK and/CK that are provided to an input circuit 212. The external clocks may be complementary. The input circuit 212 generates an internal clock ICLK based on the CK and/CK clocks. The ICLK clock is provided to the command decoder 206 and to an internal clock generator 214. The internal clock generator 214 provides various internal clocks LCLK based on the ICLK clock. The LCLK clocks may be used for timing operation of various internal circuits. The internal data clocks LCLK are provided to the input/output circuit 222 to time operation of circuits included in the input/output circuit 222, for example, to data receivers to time the receipt of write data. The input/output circuit 222 may include a number of interface connections, each of which may be couplable to one of the DQ pads (e.g., the solder pads which may act as external connections to the device 200).

The C/A terminals may be supplied with memory addresses. The memory addresses supplied to the C/A terminals are transferred, via a command/address input circuit 202, to an address decoder 204. The address decoder 204 receives the address and supplies a decoded row address XADD to the row decoder 208 and supplies a decoded column address YADD to the column decoder 210. The decoded row address XADD may be used to determine which row should be opened, which may cause the data along the bit lines to be read out along the bit lines. The column decoder 210 may provide a column select signal CS, which may be used to determine which sense amplifiers provide data to the LIO. The address decoder 204 may also supply a decoded bank address BADD, which may indicate the bank of the memory array 218 containing the decoded row address XADD and column address YADD.

The C/A terminals may be supplied with commands. Examples of commands include timing commands for controlling the timing of various operations, access commands for accessing the memory, such as read commands for performing read operations and write commands for performing write operations, refresh commands such as all-bank refresh and partial bank refresh, as well as other commands and operations. The access commands may be associated with one or more row address XADD, column address YADD, and bank address BADD to indicate the memory cell(s) to be accessed.

The commands may be provided as internal command signals to a command decoder 206 via the command/address input circuit 202. The command decoder 206 includes circuits to decode the internal command signals to generate various internal signals and commands for performing operations. For example, the command decoder 206 may provide signals which indicate if data is to be read, written, etc. The command decoder 206 may also provide one or more activations of a refresh signal REF responsive to a refresh command.

The device 200 may receive an access command which is a write command. When the write command is received, and a bank address, a row address and a column address are timely supplied with the write command, write data supplied to the data terminals DQ by the controller is provided along the data bus and written to memory cells in the memory array 218 corresponding to the row address and column address. The write command is received by the command decoder 206, which provides internal commands to perform the write operation. Write data is received by the IO circuit 222 and provided to optional ECC circuit 220, which generates parity bits based on the write data. The row decoder 208 activates a word line based on the row address XADD, and the column decoder 210 couples bit lines selected by a column select signal CS (which is based on the column address YADD) to the LIO and GIO. The write data (and parity) is written to the memory cells at the intersection of the active word line and the selected bit lines.

The device 200 may receive an access command which is a read command. When a read command is received, and a bank address, a row address and a column address are timely supplied with the read command, read data is read from memory cells in the memory array 218 corresponding to the row address and column address. The read command is received by the command decoder 206, which provides internal commands to activate the row indicated by the row address and couple the columns indicated by the column address through the LIO and GIO to the (optional) ECC circuit 220. Data (and parity) is read out to the ECC circuit 220, which corrects errors in the data based on the data and parity bits. The corrected data is provided to the IOC circuit 222, which provides the data to the DQ terminals.

The device 200 includes a mode register 230. The mode register includes a number of storage elements, such as latch circuits, organized in registers. The registers store information such as settings of the memory. A controller (e.g., 150 of FIG. 1) may perform a mode register read operation to retrieve information from a specified register or a mode register write operation to write information to a specified register. Some registers may be read only to prevent the controller from modifying them. Some registers may be updated based on conditions or operations of the memory. For example a refresh rate multiplier may be set based on a measured temperature of the array 218.

The mode register 220 includes an error correction and scrub ECS register 232. The ECS register 232 stores information about a number of errors detected on the memory device 200. The memory device may perform an ECS operation by reading out information in the array 218 to the ECC circuit 220, determining if there is a correctable error, and then writing the corrected data back to the array 218. Over the course of an ECS cycle, the memory device 200 may work its way through all of the array 218. For example, the memory device 200 may perform an ECS cycle over the course of 24 hours. The memory device 200 may update an ECS count value 232 in the mode register 230 over the course of an ECS cycle. For example, the ECS count value 232 may reflect a number of errors which were detected during the previous ECS cycle. In some embodiments, the ECS count value 232 may represent one or more other metrics (instead of or in addition to the raw error count), such as the highest number of errors along a single word line.

The device 200 includes a fuse array 240. The fuse array 240 includes a number of non-volatile storage elements such as fuses or anti-fuses, which may be used to store settings or other information about the memory device 200. The fuse array 240 stores a skip sequence identification setting 242. The skip sequence identification setting 242 may be programmed to indicate where in a sequence of devices on a module (e.g., 102 of FIG. 1) the device 200 is located. For example, the skip sequence identification setting 242 may be programmed when the device 200 is packaged on a module. In some embodiments, other methods may be used to store the skip sequence identification setting 242. For example, the skip sequence identification may be stored in the mode register 230 and may be loaded by a controller when the module initializes.

The device 200 includes refresh control circuits 216 each associated with a bank of the memory array 218. Each refresh control circuit 216 may determine when to perform a refresh operation on the associated bank. Responsive to the refresh command REF, the refresh control circuit 216 performs one or more refresh operations. As part of a refresh operation, the refresh control circuit 216 provides a refresh address RXADD (along with one or more refresh signals, not shown in FIG. 1). The row decoder 208 performs a refresh operation on one or more word lines associated with RXADD. The refresh control circuit 216 may perform multiple types of refresh operation, which may determine how the address RXADD is generated, as well as other details such as how many word lines are associated with the address RXADD.

As part of a normal or sequential (or CBR) refresh operation, the refresh address RXADD may be generated based on a sequence of refresh addresses. For example, each refresh address RXADD may be based on a previous value of RXADD (e.g., RXADD (i+1)=RXADD (i)+1). As part of a targeted refresh operation, the refresh address RXADD may be generated based on an identified aggressor address. For example, the refresh control circuit 216 may identify an aggressor based on how many times that address has been accessed, and then generate refresh addresses which are associated with the victims of that aggressor. For example, the victims may be the word lines which are adjacent to the aggressor (e.g., RXADD=Aggressor+/−1). Other relationships between the aggressor and refresh addresses and other numbers of refresh addresses per aggressor may be used in other example embodiments.

The refresh control circuit 216 includes a skip logic circuit 217. When the refresh control circuit 216 receives the refresh signal REF, the skip logic 217 determines whether or not the refresh control circuit 216 should perform refresh operations or skip performing refresh operations. The skip logic circuit 217 determines whether or not to skip refresh operations based, in part on the skip sequence identification setting 232. For example, the skip logic circuit may include a first count value which counts a number of times the refresh signal REF is received. When that first count reaches a refresh sequence threshold, a signal is sent to a second counter, which updates. When the second counter matches the value of the skip sequence identification, then the skip logic circuit 217 may determine whether or not to skip one or more refresh operations instead of performing them responsive to REF. For example, the skip logic circuit 217 may cause the refresh control circuit 216 to take no action responsive to REF when the refresh operations are being skipped. In some embodiments, rather than count the refresh signal REF, the refresh commands may be counted instead.

The power supply terminals are supplied with power supply potentials VDD and VSS. The power supply potentials VDD and VSS are supplied to an internal voltage generator circuit 224. The internal voltage generator circuit 224 generates various internal potentials VARY, and the like based on the power supply potentials VDD and VSS supplied to the power supply terminals.

The power supply terminals are also supplied with power supply potentials VDDQ and VSSQ. The power supply potentials VDDQ and VSSQ are supplied to the input/output circuit 222. The power supply potentials VDDQ and VSSQ supplied to the power supply terminals may be the same potentials as the power supply potentials VDD and VSS supplied to the power supply terminals in an embodiment of the disclosure. The power supply potentials VDDQ and VSSQ supplied to the power supply terminals may be different potentials from the power supply potentials VDD and VSS supplied to the power supply terminals in another embodiment of the disclosure. The power supply potentials VDDQ and VSSQ supplied to the power supply terminals are used for the input/output circuit 122 so that power supply noise generated by the input/output circuit 122 does not propagate to the other circuit blocks.

Figure 3:
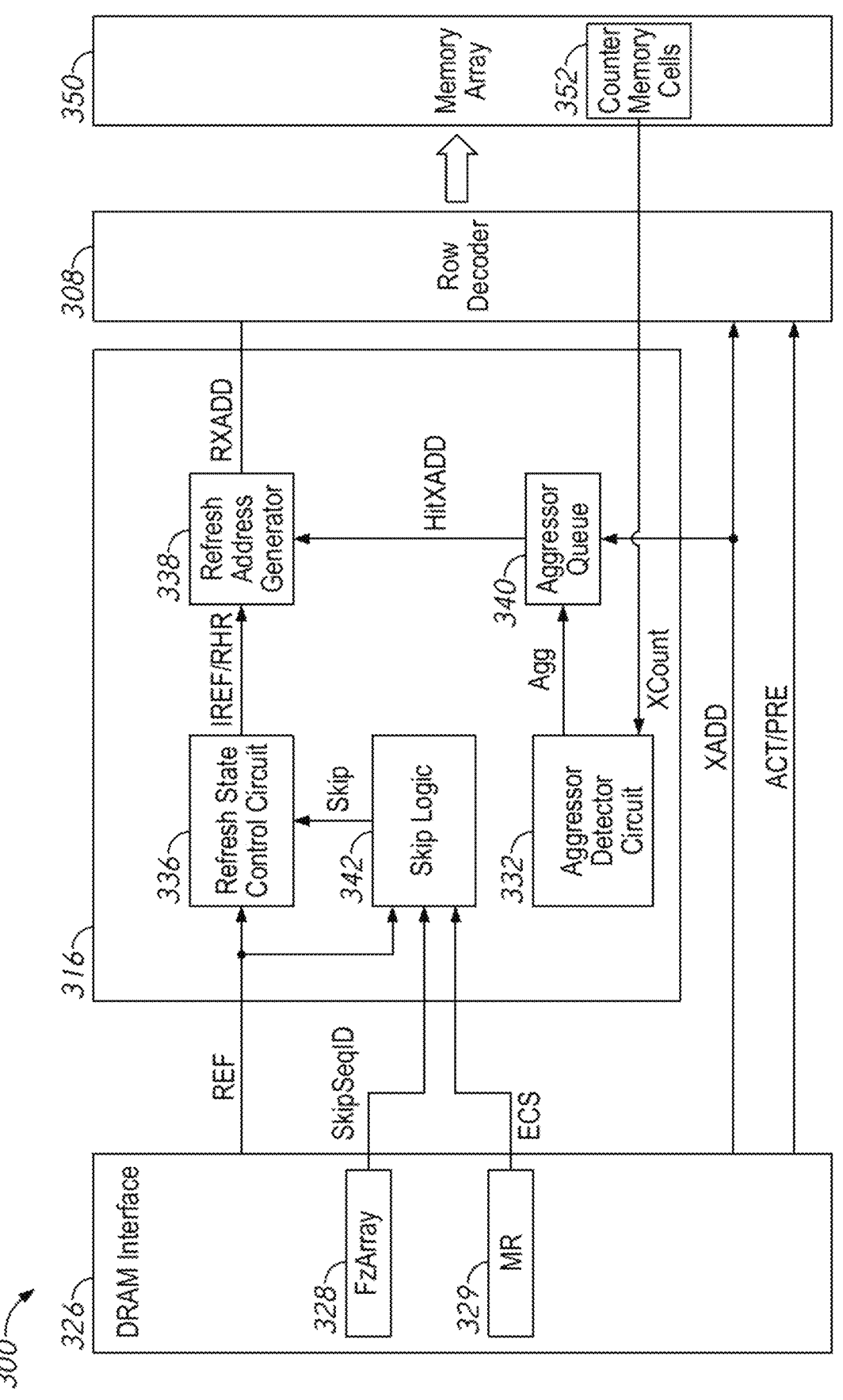
FIG. 3 is a block diagram of a refresh control circuit according to some embodiments of the present disclosure.

FIG. 3 is a block diagram of a refresh control circuit according to some embodiments of the present disclosure. The memory 300 may, in some embodiments, implement a portion of a memory device such as 104/110 of FIGS. 1 and/or 200 of FIG. 2. The memory 300 shows certain components and signals which are used in refresh operations. The memory 300 includes a refresh control circuit 316 which may, in some embodiments implement the refresh control circuit 216 of FIG. 2. Also shown in FIG. 3 is a row decoder 308 (e.g., 208 of FIG. 2), a memory array 350 (e.g., 218 of FIG. 2) and a DRAM interface 326, which represents other components of the memory, such as the command decoder (e.g., 206 of FIG. 2) and address decoder (e.g., 204 of FIG. 2). The DRAM interface 326 is shown as including a fuse array 328 (e.g., 240 of FIG. 2) and a mode register 329 (e.g., 230 of FIG. 2).

The refresh control circuit 316 includes a refresh state control circuit 336 which receives the refresh signal REF from the interface 326 and determines how many normal and targeted refresh operations should be performed by issuing internal refresh signal IREF and/or targeted refresh signal RHR. Responsive to IREF and/or RHR, a refresh address generator 338 of the refresh control circuit 316 provides a refresh address RXADD. The refresh control circuit 316 also includes an aggressor detector circuit 332 which determines if an accessed row address XADD is an aggressor or not, and a targeted refresh queue 340 which stores the identified aggressor addresses. When the refresh state control circuit 336 calls for a targeted refresh operation, the refresh address generator 338 generates the refresh address RXADD based on an aggressor address HitXADD from the queue 340. The refresh control circuit 316 also includes a skip logic circuit 342 (e.g., 132 of FIGS. 1 and/or 217 of FIG. 2) which provides a skip signal Skip at an active level to indicate when the refresh control circuit should skip performing refresh operations responsive to REF.

The DRAM interface 326 represents various components of the memory which send and receive signals and addresses to the refresh control circuit 316 and row decoder 350. The signals may be based on commands and/or addresses received from outside the memory (e.g., from a controller such as 250 of FIG. 2) and/or may be internally generated signals. As part of access operations, the DRAM interface 326 provides a row address XADD along with an activation signal ACT. Responsive to the signal ACT, the row decoder activates the word line of the memory array 350 associated with XADD. At the end of the access operation, the DRAM interface provides a pre-charge command PRE, and responsive to that the active word line is pre-charged. As part of refresh operations, the DRAM interface provides a refresh signal REF, which may be based on a refresh command received from a controller. Responsive to the refresh signal REF, the refresh control circuit 316 performs one or more refresh operations when the skip signal Skip is inactive.

The refresh state control circuit 336 receives the refresh signal REF and generates one or more activations of an internal refresh signal IREF and/or a targeted refresh signal RHR when the skip signal Skip is inactive. The number of times that IREF/RHR are activated, and in what combination, determines a sequence of refresh operations performed responsive to REF. In an example embodiment, if IREF is active, but not RHR, a normal refresh operation may be performed. If both IREF and RHR are active, then a targeted refresh operation may be performed. If the signal Skip is active, then the refresh state control circuit 336 may skip refresh operations by not providing IREF or RHR responsive to REF.

When the skip signal is inactive, the refresh state control circuit 336 may determine how many refresh operations to perform responsive to REF, and what distribution of normal and targeted refresh operations, based on internal logic. For example, responsive to REF, the refresh state control circuit may perform 3 refresh operations (e.g., three 'pumps' of the internal refresh signal IREF per REF). Two of those pumps may be targeted refresh operations and the third may be a normal refresh operation.

The refresh address generator circuit 338 provides a refresh address RXADD which indicates which word line or word lines should be refreshed as part of a refresh operation. As part of a normal refresh operation (e.g., when IREF but not RHR is active), sequence logic may be used to generate the refresh address. For example, the refresh address generator circuit 338 may include a counter circuit which generates a new normal refresh address based on a previous normal refresh address. Responsive to the refresh address RXADD and the refresh signal IREF, the row decoder 308 refreshes one or more word lines associated with the refresh address RXADD. In some embodiments, the normal refresh address may be associated with multiple word lines. For example, during a normal refresh operation the refresh address RXADD may be truncated, and all the word lines associated with that truncated portion may be refreshed in common.

As part of a targeted refresh operation (e.g., when both IREF and RHR are active), the refresh address generator 338 generates the refresh address RXADD based on an identified aggressor address HitXADD provided by the targeted refresh queue 340. The refresh address generator 338 may generate multiple refresh addresses based on a single aggressor address HitXADD. For example, the refresh address generator 338 may generate a first refresh address associated with a first word line adjacent to the word line associated with HitXADD and a second refresh address associated with a second word line adjacent to the word line associated with HitXADD. In some embodiments, other relationships may also be used. For example, every Nth targeted refresh operation, word lines further away than adjacent from the word line associated with HitXADD may be refreshed. In some embodiments, the refresh address RXADD generated as part of a targeted refresh operation may be associated with a single word line. Responsive to the refresh address RXADD and the refresh signal IREF, the word line associated with RXADD is refreshed by the row decoder 308. In some embodiments, the refresh address may be associated with fewer word lines during a targeted refresh operation than during a normal refresh operation. In other words, fewer word lines may be refreshed as part of a targeted refresh operation than a normal refresh operation.

The refresh control circuit 316 includes an aggressor detector circuit 332 which determines if a row address XADD should be added to the targeted refresh queue 340 or not (e.g., if the row address XADD is an aggressor address). When the current row address is determined to be an aggressor, the aggressor detector circuit provides an aggressor signal Agg. The aggressor detector circuit 332 may use various criteria to determine if the address is an aggressor. In some embodiments, random sampling may be used. In some embodiments, the aggressor detector circuit 332 may store addresses and count a number of times they are accessed. In some embodiments, an example of which is shown in FIG. 3 and described in more detail herein, per-row activity tracking (PRAC) may be used. However, the present disclosure is not limited to the use of PRAC for tracking aggressor addresses.

In embodiments where PRAC is used, the memory array 350 includes a number of a counter memory cells which store a number of count values XCount each associated with a word line of the memory. For example, each word line may include a set of counter memory cells which store that word lines count value XCount as a binary number. When a word line is accessed, its count value XCount is read out to the aggressor detector circuit 332. The aggressor detector circuit 332 updates the count value XCount (e.g., by incrementing it) and compares the updated count to a threshold. If the count has not crossed the threshold, then the updated count value is written back to the counter memory cells 352. If the count has crossed the threshold (e.g., is equal to or greater than the threshold) then the aggressor detector circuit 332 provides an aggressor signal Agg, and resets the count value (e.g., to an initial value such as 0). In some embodiments, the threshold may be a maximum value of the count, and the count may cross the threshold when it 'rolls over' from a maximum value back to the initial value.

The targeted refresh queue 340 includes a register with a number of slots, each of which may store an address. The queue 340 may be made from a number of content addressable memory (CAM) cells, and may be referred to as a CAM in some embodiments. Responsive to the signal Agg, the targeted refresh queue 340 stores the current row address XADD in an empty one of the slots. Responsive to targeted refresh operation (e.g., the signal RHR), an address in the queue 340 is provided as HitXADD and removed from the queue 340.

The refresh control circuit 316 includes a skip logic circuit 342 which determines whether the refresh control circuit 316 should skip refresh operations or not. The skip logic circuit 342 counts the refresh signals REF to determine when to provide the skip signal. The skip logic circuit 342 may count refresh signals to determine when it is the current devices turn to skip refresh operations. For example, the skip sequence identification SkipSeqID in the fuse array 328 may be used to determine if it is the current device's turn. By controlling when to provide the signal Skip when it is the device's turn, the skip logic circuit 342 lowers a rate at which refresh operations are performed during the device's turn (compared to when it is not the device's turn).

In some embodiments, the skip logic 342 may check an ECS register in the mode register 329 when it is the device's turn to determine whether or not provide the skip signal. For example, if the ECS count is above a threshold, the skip logic circuit 342 may not provide the skip signal Skip, even if it is the device's turn.

Figure 4:
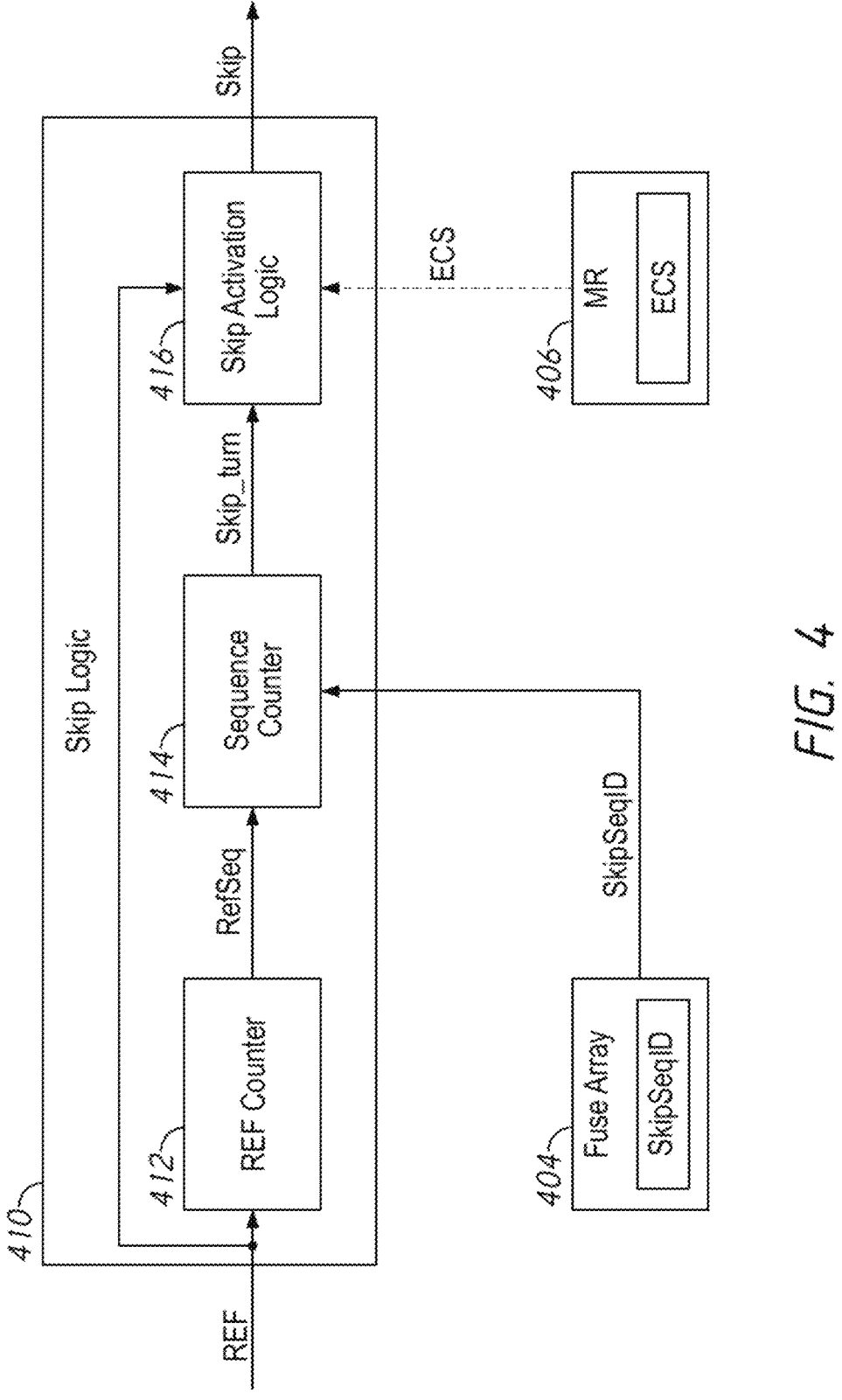
FIG. 4 is a block diagram of a skip logic circuit according to some embodiments of the present disclosure.

FIG. 4 is a block diagram of a skip logic circuit according to some embodiments of the present disclosure. The skip logic circuit 400 may, in some embodiments, implement the skip logic circuits 132 of FIG. 1, 217 of FIGS. 2, and/or 342 of FIG. 3. Also shown in FIG. 4 is a fuse array 404 (e.g., 240 of FIGS. 2 and/or 328 of FIG. 3) and a mode register 406 (e.g., 230 of FIGS. 2 and/or 329 of FIG. 3).

The skip logic circuit 410 includes a first counter circuit 412 which counts a number of times that a refresh signal REF is received. The first counter circuit 412 provides a refresh sequence signal RefSeq which indicates when a refresh sequence has passed. A second counter circuit counts a number of times the refresh sequence has passed to determine where in a refresh sequence the module is. The second counter circuit 414 compares the sequence signal to the device's sequence ID SkipSeqID and provides a signal Skip_turn when it is the current device's turn to skip refresh operations. A skip activation logic circuit 416 provides one or more activations of a skip signal Skip responsive to the signal Skip_turn.

FIG. 4 is generally described with respect to a refresh signal REF issued by a command decoder (e.g., 206 of FIG. 2) responsive to a refresh command. However in some embodiments, the refresh commands issued by the controller may be directly counted instead.

The first counter circuit 412 (or refresh counter) updates a first count value responsive to the refresh signal REF. For example, the first count value may be incremented each time that REF is received. The first counter circuit 412 provides the signal RefSeq when the first count value crosses a first threshold. In some embodiments, the first counter circuit 412 may include a comparator circuit which compares the first count value to the first threshold. In some embodiments, the first counter circuit 412 may 'roll over' when it reaches the first threshold. The first count value is reset to an initial value (e.g., 0) when it crosses the first threshold.

In some embodiments, the first threshold represents a number of refresh signals which are received during a refresh period (e.g., the number of refresh signals which refreshes the array). Accordingly, the signal RefSeq would be provided once per refresh period. In some embodiments, the first threshold may represent a number of refresh signals which are received to refresh a subset of the memory array. For example, the first threshold may represent a number of refresh signals which refresh a bank.

The second counter circuit (or sequence counter) 414 changes a second count value responsive to the signal RefSeq. For example, the second counter circuit 414 may increment the second count value responsive to RefSeq. The second count value may represent a position of the memory module in a sequence of devices. The second count value may roll over back to an initial value after passing a value that represents the number of devices on the module. For example, in a 10×4 module, the second count value may go from 0 to 9 and then roll over back to 0. The second counter circuit 414 compares the second count value to the skip sequence identification value SkipSeqID. When the second count value matches SkipSeqID, the second counter circuit 414 provides the skip turn signal Skip_turn. The fuse array 404 provides the skip sequence identification. In some embodiments, the mode register 406 may provide SkipSeqID instead.

The skip activation logic circuit 416 determines when to provide the skip signal Skip after the signal Skip_turn is provided by the second counter circuit 414. The skip activation logic circuit 416 may provide the signal Skip for a number of refresh signals Ref after Skip_turn becomes active. In some embodiments, the signal Skip may be provided for the same period of time used as the first threshold. For example, the signal Skip may be provided as long as RefSeq matches SkipSeqID. In some embodiments when the signal Skip is provided may be offset from when the signals RefSeq and SkipSeqID match. For example, after the signals RefSeq and SkipSeqID match, the skip activation logic 416 may wait for RefSeq to update to a next value, and then provide the signal Skip. In some embodiments, the skip activation logic circuit 416 may use other patterns of providing the signal Skip. In some embodiments, the skip activation logic 416 may receive one or more of REF and/or RefSeq to help determine when to provide the signal Skip.

In some embodiments, when the signal RefSeq becomes active, the skip activation logic circuit 416 may determine whether or not to skip any refresh operations. For example, the skip activation logic circuit 416 receives ECS information from the mode register 406. The skip activation logic circuit 416 compares the ECS information to a threshold. If the ECS information has not crossed the threshold (e.g., is not above the threshold) then the skip activation logic circuit 416 may proceed to provide the skip signal Skip. If the ECS information has crossed the threshold, then the skip activation logic circuit 416 may not provide Skip (or may provide a reduced number of activations of Skip). In some embodiments the ECS information may represent a count of all of the errors detected during a previous ECS cycle. In some embodiments the ECS information may represent other ECS metrics, such as a count of how many errors are along the word line with the most errors. In some embodiments, the skip activation logic 416 may wait until the ECS information has initialized before it begins providing the skip signal. For example, the skip activation logic 416 may wait for one or more ECS cycles before it begins providing the skip signal responsive to Skip_turn.

FIG. 5 is a flow chart of a method according to some embodiments of the present disclosure. The method 500 may, in some embodiments, be implemented one or more of the apparatuses or systems described herein. For example, the method 500 may be implemented by a memory module such as 102 of FIG. 1 and/or by the memory devices thereon such as 104 and 110 of FIG. 1, 200 of FIGS. 2, and/or 300 of FIG. 3.

The method 500 begins with block 510, which describes receiving refresh commands at a plurality of memory devices (e.g., 104 and 110 of FIG. 1) of a module (e.g., 102 of FIG. 1). A controller (e.g., 150 of FIG. 1) issues the refresh commands to the module.

Block 510 is followed by block 520, which describes selecting a memory device of the plurality of media devices based on a sequence order. Each of the plurality of memory devices may take a turn in the sequence and then the sequence may repeat. The selected device is the device that's turn it currently is. Each device may be selected based on a skip sequence identification value which is stored on each of the plurality of memory devices (e.g., in a fuse array of the device). In some embodiments, only one device may be selected at a time. In some embodiments, each of the memory devices may have a different skip sequence identification value.

In some embodiments, the selecting of block 520 may include updating a first count value responsive to the refresh command (or a refresh signal generated responsive to the refresh command) and updating a second count value responsive to the first count value crossing a first threshold. In some embodiments, the first threshold represents a number of refresh commands (or refresh signals) which represent a refresh period (e.g., the number of refresh commands which refresh a memory array). The selecting of block 520 may also include comparing the second count value to the skip sequence identification value and selecting the memory device when the second count value matches the skip sequence identification value of that device.

Block 520 may be followed by blocks 530 and 540. Block 530 describes performing refresh operations responsive to the refresh commands at a first rate with the non-selected memory devices and block 540 describes performing refresh operations responsive to the refresh commands at a second rate lower than the first rate with the selected memory device. In some embodiments, the method 500 may include performing the refresh operations at the second rate with only one of the memory devices at a same time. The method 500 may include performing the refresh operations at the second rate for a refresh period, and then resuming performing the refresh operations at the first rate. The method 500 may include performing the refresh operations at the second rate by skipping one or more of the refresh operations.

In some embodiments, the method 500 may include determining whether or not to perform the refresh operations at the second rate based on error check and scrub information on the selected memory device. For example, the method 500 may include determining if ECS information is above an ECS threshold, and continuing to perform the refresh operations at the first rate even if it would otherwise be the device's turn.

Figure 6:
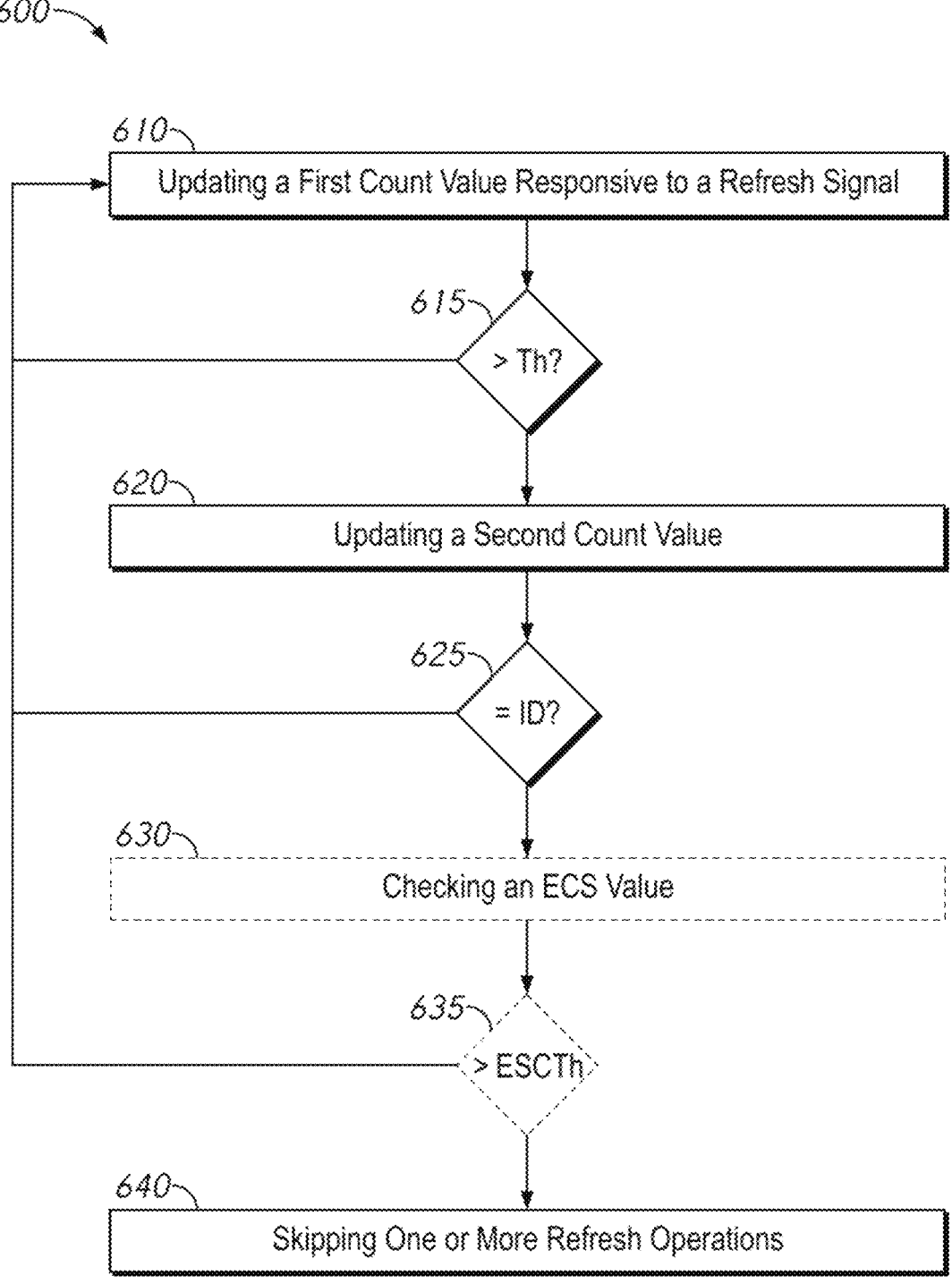
FIG. 6 is a flow chart of a method according to some embodiments of the present disclosure.

FIG. 6 is a flow chart of a method according to some embodiments of the present disclosure. The method 600 may represent the operation of a refresh logic circuit (e.g., 216 of FIGS. 2 and/or 316 of FIG. 3, on a memory device (e.g., 104/110 of FIG. 1, 200 of FIGS. 2, and/or 300 of FIG. 3). For example, the method 600 may be implemented by a skip logic circuit such as 132 of FIG. 1, 217 of FIG. 2, 342 of FIGS. 3 and/or 400 of FIG. 4.

The method 600 may generally begin with box 610, which describes updating a first count value responsive to a refresh signal. For example, with a first counter circuit such as 412 of FIG. 4. Updating the first count value may be incrementing the first count value. The refresh signal may be generated responsive to a refresh command. In some embodiments, the refresh command may be directly counted.

Box 610 is followed by box 615, which describes determining if the first count value has crossed (e.g., is greater than) a first threshold. If it has not, the method 600 returns to box 610. If it has crossed the first threshold, the method proceeds to box 620. In some embodiments, the first threshold may represent a number of refresh signals in a refresh period. The method 600 may include resetting the first count value to an initial value when the first value crosses the first threshold.

Box 620 describes updating a second value responsive to the first count value having crossed the first threshold. For example, with a second counter circuit such as 414 of FIG. 4. Updating the second count value may be incrementing the first count value. The second counter circuit may indicate a position in a sequence of devices on a memory module.

Box 620 is followed by box 625, which describes determining if the second count value matches a skip sequence identification value. If the count and value do not match, the method 600 may return to box 610. If the count and value do match, then the method 600 proceeds to box 640.

In some embodiments, the method 600 may include optional steps described by boxes 630 and 635 before box 640. Box 630 describes checking an ECS value and box 635 describes determining if the ECS value has crossed an ECS threshold. If the ECS value has not crossed the threshold, then the method 600 returns to box 610. If the ECS value has crossed the ECS threshold, then the method 600 proceeds to box 640.

Box 640 describes skipping one or more refresh operations. The method 600 may include performing refresh operations responsive to the refresh signal or skipping performing the refresh operations. For example, the method 600 may include generating a skip signal and skipping refresh operations when the skip signal is being provided. In some embodiments, the method 600 may include skipping all refresh operations during a refresh period.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. An apparatus comprising:
   a plurality of memory devices configured to receive refresh commands in common, wherein each of the plurality of memory devices comprises:
      a fuse array configured to store a respective skip sequence identification value;
   a refresh control circuit configured to determine if it is a respective device's turn in a sequence based on the refresh commands and the respective skip sequence identification value, and configured to perform refresh operations at a first rate responsive to the refresh commands if it is not the respective device's turn and perform refresh operations at a second rate lower than the first rate if it is the respective device's turn.

2. The apparatus of claim 1, wherein the refresh control circuit comprises:
   a first counter circuit configured to provide a refresh sequence signal based on a count of refresh commands;
   a second counter circuit configured to update a sequence counter based on the refresh sequence signal,
   wherein the refresh control circuit is configured to determine when is the respective device's turn based on a comparison of the skip sequence counter to the skip sequence identification value.

3. The apparatus of claim 1, wherein each of the plurality of memory devices has a different skip sequence identification value.

4. The apparatus of claim 1, wherein only one of the plurality of memory devices is performing refresh operations at the second rate at one time.

5. The apparatus of claim 1, wherein the refresh control circuit is configured to skip performing refresh operations for a refresh period when it is the respective device's turn.

6. The apparatus of claim 1, wherein each of the plurality of memory device includes an error correction code (ECC) circuit configured to generate an error correction and scrub (ECS) value based on a count of errors during a previous ECS period, and
   wherein the refresh control circuit is configured to not perform refresh operations at the first rate if the ECS value is above a threshold regardless of if it is the respective device's turn or not.

7. An apparatus comprising:
   a first counter circuit configured to update a first count value responsive to a refresh signal;
   a second counter circuit configured to update a second count value responsive to the first count value crossing a first threshold;
   a skip activation logic circuit configured to provide a skip signal when the second count value matches a skip sequence identification value; and
   a refresh state control circuit configured to perform a refresh operation responsive to the refresh signal unless the skip signal is active.

8. The apparatus of claim 7, wherein the first threshold represents a number of refresh signals in a refresh period.

9. The apparatus of claim 7, wherein the skip activation logic circuit configured to not provide the skip signal for a first refresh period after the second count value matches a skip sequence identification value and provide the skip signal for a second refresh period after the second count value matches a skip sequence identification value.

10. The apparatus of claim 7, further comprising a fuse array configured to store the skip sequence identification value.

11. The apparatus of claim 7, further comprising:
   a mode register configured to store an ECS value,
   wherein the skip activation logic circuit is configured to provide the skip signal when the second value matches the skip sequence identification value and when the ECS value is below an ECS threshold.

12. The apparatus of claim 11, wherein the skip activation logic circuit is configured to not provide the skip signal until the ECS value initializes.

13. The apparatus of claim 7, wherein the skip logic circuit configured to provide the skip signal for the first threshold number of refresh signals.

14. A method comprising:

receiving refresh commands at a plurality of memory devices on a module;

selecting a memory device based on a sequence order;

performing refresh operations responsive to the refresh commands at a first rate with the non-selected memory devices; and performing refresh operations responsive to the refresh commands at a second rate lower than the first rate with the selected memory device.

15. The method of claim 14, further comprising performing refresh operations at the second rate with only one of the memory devices of the module at a same time.

16. The method of claim 14, further comprising performing the refresh operations at the second rate for a refresh period.

17. The method of claim 14, further comprising selecting the memory device based on a respective skip sequence identification value stored on each of the plurality of memory devices.

18. The method of claim 17, further comprising:

updating a first count value responsive to the refresh command;

updating a second count value responsive to the first count value crossing a first threshold; and selecting the memory device when the second count value matches the respective skip sequence identification value.

19. The method of claim 14, further comprising performing the refresh operations at the second rate by skipping one or more of the refresh operations.

20. The method of claim 14, further comprising determining whether or not to perform the refresh operations at the second rate based on error check and scrub information on the selected memory device.

* * * * *